Jan. 28, 1930.  E. LABRÉLY  1,744,773
PHOTOGRAPHIC APPARATUS
Filed Jan. 24, 1927  4 Sheets-Sheet 1
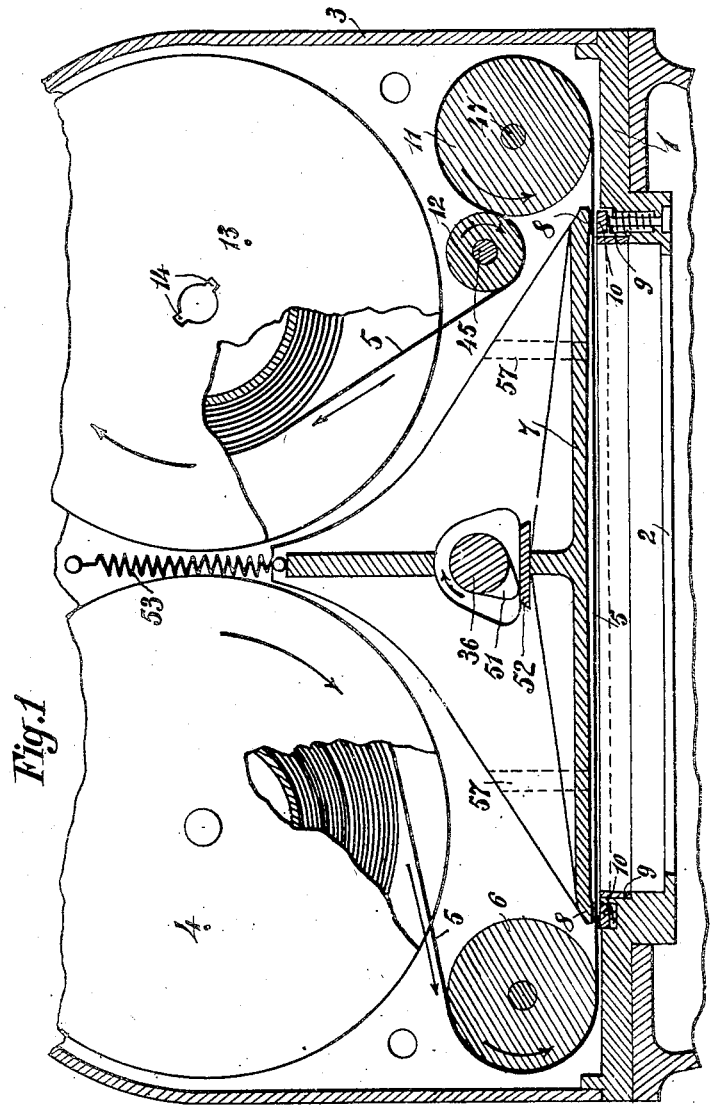

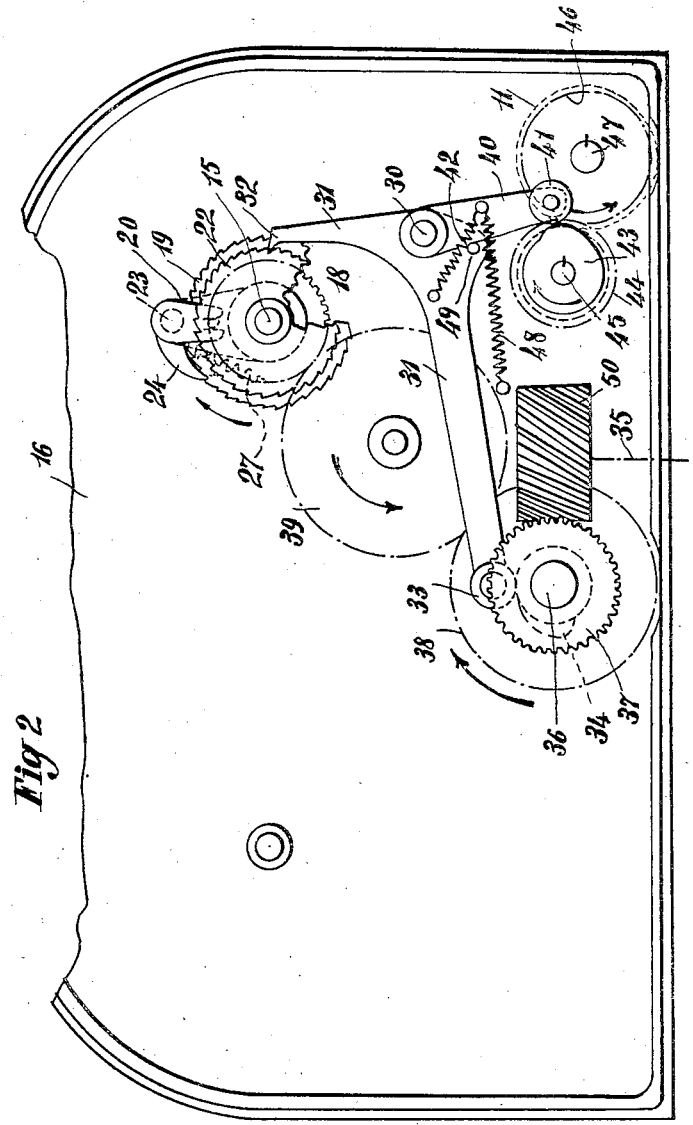

Jan. 28, 1930.　　　E. LABRÉLY　　　1,744,773

PHOTOGRAPHIC APPARATUS

Filed Jan. 24, 1927　　　4 Sheets-Sheet 3

Inventor
Emile Labrély
By Edward C. Sorensen
Attorney

Jan. 28, 1930.  E. LABRÉLY  1,744,773
PHOTOGRAPHIC APPARATUS
Filed Jan. 24, 1927  4 Sheets-Sheet 4
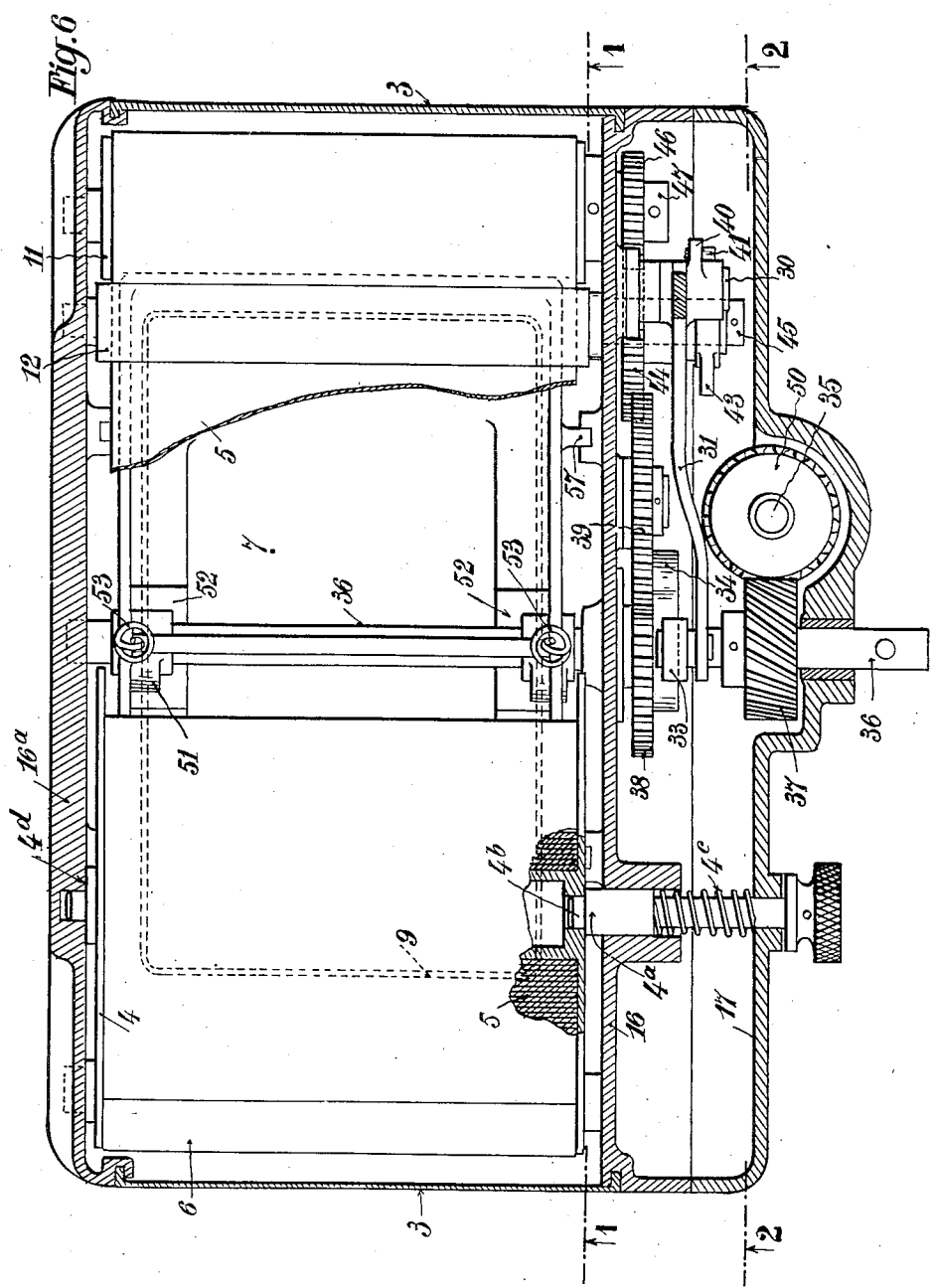

Patented Jan. 28, 1930

1,744,773

UNITED STATES PATENT OFFICE

EMILE LABRÉLY, OF CHATON, FRANCE

PHOTOGRAPHIC APPARATUS

Application filed January 24, 1927, Serial No. 163,149, and in France March 31, 1926.

This invention relates to photographic apparatus, and particularly to mechanism for controlling and operating a continuous film.

1. In consequence of the special mechanisms which it contains, it permits of obtaining, by utilizing the regular movement of an external driving shaft rotating intermittently, a perfectly regulated distribution of the action of the members which drive and stop the film, this latter being moved by lengths which are always equal without the use of grippers or of drums driven by intermittent movements.

2. The part of the film which is exposed to the light while a view is being taken is kept rigorously flat.

In the accompanying drawings, given by way of example,

Fig. 1 is a vertical sectional view of an apparatus embodying the invention;

Fig. 2 is a view of the apparatus in side elevation with the cover removed;

Fig. 6 is a horizontal sectional view taken on lines 6—6 of Figs. 1 and 2.

Figure 4:
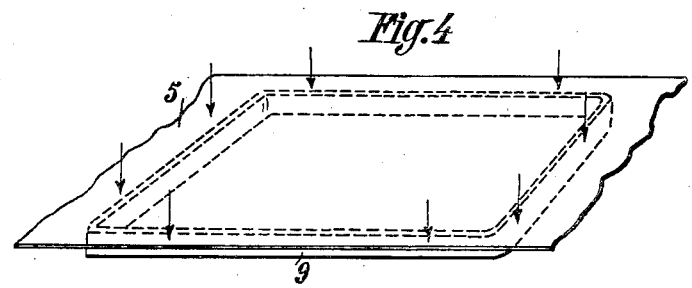
Fig. 4 is a perspective view, partly in section, of devices for stretching and clamping the film over the exposure opening.

The magazine is composed substantially of a base plate 1 having an opening as at 2, a cover 3, a reel 4 for the unexposed film 5 which passes over a roller 6 which is loose and covered with rubber and afterwards over the opening 2 and between, on the one hand, a plate 7 with a flange 8 and, on the other hand, a fixed frame 9 surrounded by a movable frame 10; finally having passed over the rubber covered rollers 11 and 12, the exposed film is wound up on a reel 13.

The reel 4 is mounted loosely on its shaft, but is slightly braked by any suitable means, for instance, by means of a pusher $4^a$ mounted on the shaft $4^b$ and urged inwardly by a spring $4^c$, the pusher applying the part $4^d$ of the reel against the wall $16^a$ of the casing.

On the contrary the reel 13 is keyed at 14 on a shaft 15 journaled in the walls 16, $16^a$ of the casing, a removable cover 17 being provided to enclose the operating mechanism.

On shaft 15 are mounted loosely a pinion 18 and a ratchet wheel 19 secured together by screws $19^a$. A crank 20 is fixed to shaft 15 by a set screw 21 and a second ratchet wheel 22 is mounted loosely on the shaft at the outer side of this crank. Crank 20 carries a short rotatable shaft 23 to which are fixed at opposite ends a pawl 24 adapted to engage ratchet 19 and a fork 25 which engages a pin 26 projecting laterally from ratchet wheel 22. A spring 27 attached to a screw 28 on crank 20 and to a pin 29 on ratchet 22 yieldingly connects crank 20 with ratchet 22.

On a shaft 30 (see Figure 2) is pivoted a large lever 31 having, on the one hand, a nose 32 adapted to engage with the ratchet 22 and having, on the other hand, a roller 33 on which acts a cam 34 fixed on a shaft 36, on which are keyed a worm wheel 37 and a pinion 38 which an intermediate pinion 39 connects to the pinion 18 above mentioned.

On the shaft 30 is likewise pivoted an arm 40 carrying a roller 41 which a spring 42, attached to the lever 31 and arm 40, holds in contact with a cam 43 integral with a pinion 44. These members 43 and 44 are mounted and keyed on the shaft 45 on which the roller 12 is adapted to revolve loosely and consequently independently of the pinion 44 into which gears a pinion 46 fixed on a shaft 47 on which the roller 11 is fast.

A spring 48 fixed at one end to the wall 16 of the casing and at the other end to arm 40 tends, like the spring 42, to cause the roller 41 to bear on the cam 43, and also to press the lever 40 against a finger 49 fixed on the lever 31, which tends to move the nose 32 away from the ratchet wheel 22 and the roller 33 away from the cam 34. This is what takes place when the boss of the cam 43 does not act on the roller 41.

All the mechanism which the casing contains is driven by a worm 50 engaging with the wheel 37 and driven by a shaft 35 coming from the lower part of the whole of the apparatus for taking the views.

This shaft 35 rotates intermittently with a regular movement under the action of any suitable driving mechanism.

On the shaft 36 which extends into the interior of the casing are formed cams 51 adapted to act on horizontal plates 52 secured to plate 7, the cams being thus adapted to press the plate 7 downwardly against the action of springs 53.

Figure 5:
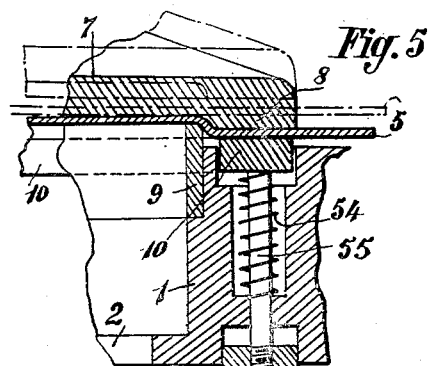
Fig. 5 is a fragmentary sectional view further illustrating the devices shown in Fig. 4.
Figure 3:
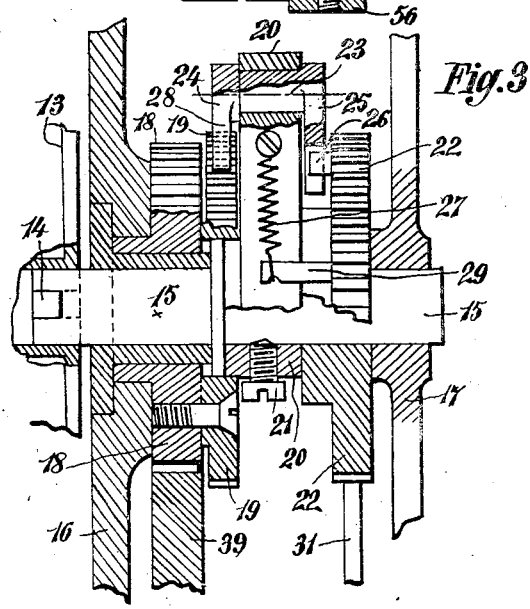
Fig. 3 is a sectional view showing the reel driving mechanism.

The movable frame 10 rests on a certain number of springs 54 (see Figures 1 and 5) each of which surrounds a screw threaded rod 55 the nut 56 of which limits, in an upward direction, the movement thereof and also that of the frame 10 to which each rod 55 is fixed.

The plate 7 is guided in its vertical movements by the engagement of projections 57 in vertical grooves formed in the walls of the casing.

The general action of the apparatus is as follows:

While one view is being taken, or while one view is waiting to be taken, the shutter of the lens being set the shaft 35 is locked and consequently all the parts of the apparatus are at rest, the film being at this moment stretched and clamped by plate 7.

When the view has been taken, the shaft 35 commences to rotate. Through the transmission 50, 37 and 36, the cams 51 rotate, which permits the springs 53 to lift the plate 7 to the position shown in Figure 1 or in dot and dash lines in Figure 5.

The film 5 is then no longer held to the frames 9 and 10 and is no longer in contact with these frames nor with the plate.

The cam 34 then raises the lever 31 the nose 32 of which moves away from the ratchet 22. The spring 27 (which was placed under tension at the end of the last operation, as will presently appear) immediately rotates ratchet 22 until fork 25 comes into the position shown in Fig. 2, which brings the pawl 24 into engagement with the ratchet 19.

By the wheels 38 and 39, the wheel 18 and the ratchet wheel 19 are driven as soon as the rotation of the shaft 35 begins, but the movement cannot be transmitted to the crank 20 and consequently to the shaft 15, until the pawl 24 has been brought into engagement with the ratchet 19, as has just been described.

When the pawl 24 is brought into engagement with ratchet 19, the reel 13 is driven by the shaft 15. It displaces the film 5 by winding it up, until the portion of this latter bearing the view which has just been taken, is situated out of the field of the opening 2.

This movement of the film rotates the roller 11 and consequently shaft 47, gears 46 and 44 and cam 43, and when the proper amount of film has been wound on roller 13 cam 43 will engage roller 41 on arm 40 and, since arm 40 is connected by spring 42 to lever 31, this lever will be rotated to bring its nose 32 into engagement with ratchet wheel 22, locking this ratchet from rotation in a clockwise direction, looking at Fig. 2. When this happens, continued rotation of ratchet 19 and crank 20 will place spring 27 under tension and will cause the short shaft 23 to be rotated and disengage pawl 24 from ratchet 19, since pin 26 on ratchet 22 is held relatively stationary and so causes fork 25 to rotate. The disengagement of pawl 24 from ratchet 19, of course, stops the rotation of shaft 15 irrespective of any further rotation of gearing 50—18. The further rotation of shaft 36 causes cams 51 to press down plate 7 on the new portion of the film, stretching and clamping the film in a perfectly flat and secure manner, whereupon the rotation of shaft 36 ceases. The parts will occupy these positions until the next operation is initiated by the engagement of cam 34 with the roller 33 of lever 31, upon the next succeeding operation of shaft 36.

The film is thus always displaced by the same amount at each successive operation, since the cam 43 determines the length of film displaced and this cam is operated by the movement of the film through the gears 44 and 46, the latter being fixed on shaft 47 which is operated by the film passing over roller 11.

What I claim is:

1. An apparatus of the kind described comprising in combination, a casing having an exposure opening, a pair of reels in the casing, one of which supports the unexposed part of a film and the other which is adapted to be operated to wind up the exposed part of the film, guide rollers at opposite sides of the opening for positioning the film thereover, a reciprocable member surrounding said opening and slightly spaced therefrom, springs normally holding said member substantially even with the upper edge of said opening, a plate mounted to reciprocate above the opening and having a marginal flange adapted to press the film down on said member to stretch the film smoothly over said opening and means for reciprocating said plate.

2. An apparatus of the kind described comprising, in combination, a casing having an exposure opening, reels carrying the film, rollers adapted to guide the film, a frame, springs for said frame, a plate adapted to stretch the film over the edge of the opening, springs for throwing out said plate, a power shaft, a shaft provided with cams adapted to press the plate against the film, a gearing for throwing in the cam shaft, and means for intermittently transmitting the driving movement to one of said reels.

3. An apparatus of the kind described comprising, in combination, a casing having an exposure opening, reels carrying the film, guide rollers for the film, a frame, springs for said frame, a plate adapted to stretch the film over the edge of the opening, springs for throwing out the said plate, a power shaft, a shaft provided with cams adapted to press the plate against the film, a gearing for throwing in the cam shaft, a shaft keyed one one of said reels, toothed wheels adapted to transmit the driving movement to a first ratchet wheel secured to one of the said toothed wheels, a second ratchet wheel loosely mounted on the above shaft, a double crank connected with the cam shaft, adapted to be thrown in intermittently and provided with a tooth for engagement with the second ratchet wheel, an arm or crank (20) secured to the shaft of the second reel, an axle carried by the said arm and provided with a fork and a pawl, a spring connecting the second ratchet wheel with the arm, a finger of the last mentioned ratchet wheel being adapted to throw in the fork and pawl, a secondary lever (40) on the said double crank, a pull-off spring for the latter, a pull-off spring for the secondary lever, and means for measuring the length of each exposed part of the film.

4. An apparatus of the kind described comprising, in combination, a casing, reels mounted therein adapted to carry a film, means for stretching the film over an exposure opening of said casing, means for throwing in intermittently the winding reel to wind up equal lengths of the film comprising a double pawl crank, a secondary lever, a measuring roller (11), a shaft to which said roller is fixed, a toothed wheel fixed to said shaft and adapted to engage a toothed wheel carried by an axle, a cam (43) carried by said axle, said cam being adapted to throw in at regular intervals said secondary lever, and a roller (12) mounted loosely on said axle.

In testimony whereof I hereunto affix my signature.

EMILE LABRÉLY.